United States Patent
Jones et al.

(10) Patent No.: US 6,588,763 B1
(45) Date of Patent: Jul. 8, 2003

(54) SEAL ARRANGEMENT PROVIDING A SEAL BETWEEN A BORE AND A ROD MOVEABLE IN THE BORE

(75) Inventors: Norman Stewart Jones, Leighton Buzzard (GB); David Woodroffe, Luton (GB)

(73) Assignee: Smiths Group PLC, London (GB)

( * ) Notice: Subject to any disclaimer, the term of this patent is extended or adjusted under 35 U.S.C. 154(b) by 213 days.

(21) Appl. No.: 09/637,394

(22) Filed: Aug. 11, 2000

Related U.S. Application Data

(60) Division of application No. 09/020,136, filed on Feb. 6, 1998, now Pat. No. 6,158,744, which is a continuation-in-part of application No. 08/673,779, filed on Jun. 27, 1996, now abandoned.

(30) Foreign Application Priority Data

Jul. 3, 1995 (GB) ............................................. 9513507

(51) Int. Cl.[7] .................................................. F16J 9/28
(52) U.S. Cl. ...................... 277/448; 277/928; 277/579
(58) Field of Search ............................... 277/447, 448, 277/465, 502, 579, 580, 582, 908, 909, 928

(56) References Cited

U.S. PATENT DOCUMENTS

| | | | | |
|---|---|---|---|---|
| 2,462,596 A | * | 2/1949 | Bent | |
| 2,647,810 A | * | 8/1953 | MoCuistion | |
| 2,918,340 A | * | 12/1959 | Knoebel | |
| 3,214,182 A | * | 10/1965 | Herbruggen | |
| 3,390,889 A | * | 7/1968 | Grover | |
| 3,418,001 A | * | 12/1968 | Rentschler et al. | |
| 3,782,736 A | * | 1/1974 | Valente | |
| 4,123,068 A | * | 10/1978 | Van Gorder | |
| 4,736,586 A | * | 4/1988 | Kawajiri et al. | |
| 4,900,042 A | * | 2/1990 | Genda | |
| 4,921,258 A | * | 5/1990 | Fournier et al. | |
| 5,074,154 A | * | 12/1991 | Allen et al. | |
| 5,076,589 A | * | 12/1991 | Marsi | |
| 5,092,125 A | * | 3/1992 | Leight-Monstevens et al. | |
| 5,344,162 A | * | 9/1994 | Kernon et al. | |
| 6,129,358 A | * | 10/2000 | Kiesel et al. | |

\* cited by examiner

*Primary Examiner*—Anthony Knight
*Assistant Examiner*—Vishal Patel
(74) *Attorney, Agent, or Firm*—Arnold B. Silverman; David C. Jenkins; Eckert Seamans Cherin & Mellott, LLC

(57) ABSTRACT

A seal arrangement provides a seal between a bore and a rod movable in the bore with a gap formed between the bore and the rod. The seal arrangement includes a floating elastomeric sealing ring which is accommodated in a circumferential groove around the rod. The sealing ring sealingly engages the wall of the bore. An annular resilient biasing device is also accommodated in the groove. The biasing device acts between one wall of the groove and the sealing ring to urge the sealing ring against an opposing wall of the groove. In addition, the biasing device is configured to allow passage of fluid past the biasing device between a region of the groove disposed radially inwardly of the sealing ring and the gap between the rod and the bore on the side of the sealing ring opposite the opposing wall. The biasing device has, at least at some circumferential positions therearound, a cross-sectional profile that reduces in radial width towards one wall of the groove. The biasing device can be provided as an elastomeric loading ring that provides at least one passage for fluid flow between its radially outer side and its radially inner side.

2 Claims, 3 Drawing Sheets

SEAL ARRANGEMENT PROVIDING A SEAL BETWEEN A BORE AND A ROD MOVEABLE IN THE BORE

CROSS REFERENCE TO RELATED APPLICATIONS

This application is a divisional application of U.S. patent application Ser. No. 09/020,136 by Norman S. Jones et al. having a filing date of Feb. 6, 1998 now U.S. Pat. No. 6,158,744, which is a continuation-in-part of U.S. patent application Ser. No. 08/673,779 to Norman S. Jones having a filing date of Jun. 27, 1996, which is now abandoned.

BACKGROUND OF THE INVENTION

THIS INVENTION relates to a seal arrangement for effecting a seal between a movable rod, shaft or like element and a passage through which said element extends, for example for sealing a shaft with respect to a bore in which the shaft is movable axially, in a pneumatic system.

One of the key factors in the design of pneumatic systems with sliding elements is the design of the sealing system. Over the years a very large number of such systems have been adopted but all have ultimately been a compromise between achieving a high level of seal integrity and a low level of friction. Considerations of space, cost, tolerance to misalignment, wear rate and required manufacturing tolerances of the containing parts have been other important elements.

The increasing move towards the use of non lubricated air in pneumatic systems has emphasised the problem of achieving low friction, in order to reduce wear and to obtain other advantages associated with low friction.

Known sealing systems have used a range of designs and employed a variety of materials, combinations of materials and lubricants. One of the simplest seal arrangements is the elastomeric 'O' ring and this is still widely used for both static and dynamic sealing. Used in the conventional mode the 'O' ring is installed so that it is under constant radial compression. This gives good sealing but because of the tolerances involved and the way in which it is loaded pneumatically it tends to suffer from high wear rates and be intolerant to misalignment.

An alternative method of using an 'O' ring is to use it in the so-called 'floating' mode. In this mode the ring is installed with a nominal interference with the sliding surface but with radial clearance in the groove, receiving the 'O' ring, in the member which slides relative to that sliding surface. In this mode the pressure exerted by the ring on the sliding surface is much reduced and hence so is the friction. The problem with this arrangement is that sealing can now only be achieved if the 'O' ring is in contact with the groove wall which is exposed to the lower pressure of any differential across the seal. In some designs it is not difficult to ensure that this is so but in many applications it is possible for conditions to arise which lift the seal off that groove wall. This is particularly true during start up conditions when pressure is first applied. Once a flow is established around under the 'O' ring there is no pressure force to push it towards the respective groove wall to establish sealing. It is normal, therefore, to limit the axial clearance between the groove and the 'O' ring section to a dimension below which the ring becomes essentially bistable. At the opposite extreme it is not possible to use too small an axial clearance between the 'O' ring and the groove because in this case, when pressure is first applied during start-up, the pressure forces the ring down into the groove and once flow is established over the top of the ring sealing cannot be restored.

The net result of these limitations is that, to be sure of reliable operation of floating 'O' rings, clearances must be held to a tolerance of the order of 0.05 mm. International Standards for 'O' ring dimensions only require the section of smaller 'O' rings to be within ±0.08 mm. Therefore, selection of 'O' rings and matching with grooves is necessary to ensure that a floating 'O' ring operates satisfactorily. Even with this care, additional attention has to be paid to the amount of grease applied as too much on the side of the ring can create the same effect as too narrow a groove.

SUMMARY OF THE INVENTION

It is an object of the present invention to provide an improved seal arrangement which avoids the above-noted disadvantages.

According to one aspect of the invention there is provided a seal arrangement providing a seal between a passage and a rod or like element movable in said passage, the seal arrangement including a floating elastomeric sealing ring, as herein defined, which is accommodated in a circumferential groove around said rod or like element, and which sealingly engages the wall of said passage, and an annular resilient biasing element also accommodated in said groove, the biasing element acting between one wall of said groove and the sealing ring and serving to urge the sealing ring against the opposing wall of said groove, the biasing means being configured to allow the passage of fluid past it between the region of the groove disposed radially inwardly of the sealing ring and the gap between said rod and passage on the side of the sealing ring opposite said opposing wall.

According to another aspect of the invention there is provided a seal arrangement providing a seal between a passage and a rod or like element movable in said passage, the seal arrangement including a floating elastomeric sealing ring, as herein defined, which is accommodated in a circumferential groove around said passage and which sealingly engages the surface of said rod or like element, and an annular resilient biasing element also accommodated in said groove, the biasing element acting between one wall of said groove and the sealing ring and serving to urge the sealing ring against the opposing wall of said groove, the biasing means being configured to allow the passage of fluid past it between the region of the groove disposed radially outwardly of the sealing ring and the gap between said rod and passage on the side of the sealing ring opposite said opposing wall.

According to a further aspect of the invention there is provided a seal arrangement providing a seal between a passage and a rod or like element movable in said passage, the seal arrangement including an elastomeric ring which is accommodated in a circumferential groove around said rod or like element and which sealingly engages the wall of said passage and one wall of said groove, but has a radial clearance with respect to the bottom of said groove, said ring being compressed axially between the opposing walls of said groove and being configured, on its side engaging the groove wall opposite said one wall, so as to provide at least one passage for fluid flow between, on the one hand, the gap between said rod and said passage, and, on the other hand, the region between the ring and the bottom of said groove.

The invention allows the advantages of "floating" 'O' rings or similar "floating" sealing rings to be achieved without most of the disadvantages.

The invention makes it possible to maintain the 'O' ring or other sealing ring in contact with the lower pressure wall, irrespective of movement or actual pressure differential, whilst still ensuring that the ring can be energised against the sliding surface by any applied pneumatic pressure—however suddenly applied.

BRIEF DESCRIPTION OF THE DRAWINGS

Embodiments of the invention are described below by way of example with reference to the accompanying drawings, in which.

DETAILED DESCRIPTION OF THE INVENTION

Figure 1:
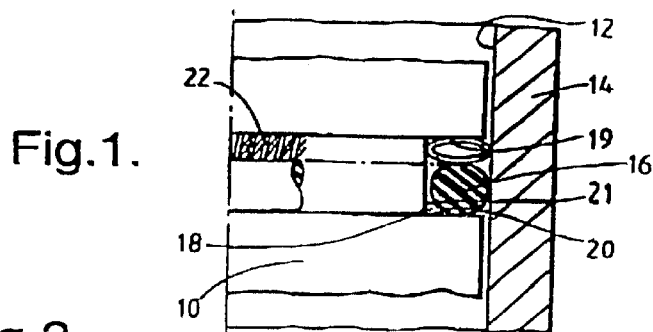
FIG. 1 is a fragmentary diagrammatic sectional view of a seal arrangement embodying the invention.

In the embodiments of the invention illustrated in FIGS. 1 to 3b of the drawings, a seal arrangement embodying the invention is used to seal a generally cylindrical, axially movable rod, shaft or piston 10 (herein referred to for convenience as shaft 10), with respect to a cylindrical bore 12 in a member 14 through which the shaft extends. In the description which follows, it is assumed that the shaft 10 and member 14 are incorporated in a pneumatic system, i.e. a system utilising compressed air or other gas, to which is exposed the portion, above the sealing arrangement, of the clearance gap between the shaft and the bore, the portion of said gap below the sealing arrangement being exposed to a lower pressure, e.g. to atmospheric pressure. The sealing arrangement includes an elastomeric 'O' ring 16—accommodated in a circumferential groove 18 in the shaft 10, the groove being of rectangular shape in section along the shaft axis, having upper and lower planar annular "side" walls 19 and 20 respectively and a cylindrical bottom wall 21 defining the radially innermost limit of the groove. As shown, the 'O' ring is used in the "floating mode", that is to say it is so dimensioned that the radially outermost (with respect to the axis of shaft 10) part of its surface sealingly engages the bore 12 as a light interference fit, whilst a clearance exists between the 'O' ring and the bottom wall 21 of the groove.

It will be understood that in this floating mode, in order for the 'O' ring to effect a seal between shaft 10 and bore 12, it is necessary for the 'O' ring to engage sealingly one of the opposing side walls of the groove. In the illustrated arrangements in FIGS. 1 and 2 the 'O' ring engages the lower "side" wall 20 of the groove, such engagement being ensured by a resilient biasing or loading element (referenced 22 in FIG. 1 and 24 in FIG. 2). The biasing element 22, 24 is located in the groove immediately above the 'O' ring, i.e. on the high pressure side of the seal, the width of the groove being sufficient to accommodate both the 'O' ring and the loading element with the loading element 22, 24 under appropriate axial compression. The biasing element 22, 24 has the following characteristics:

(a) It applies substantially equally distributed axial pressure on the 'O' ring 16 to keep it in contact with the downstream wall 20.

(b) It allows an adequate flow of gas to pass it both radially and axially to ensure that the applied pneumatic pressure is immediately transferred to the side of the 'O' ring that loads it against the sliding surface 12, and to balance any radially inwardly directed component of the gas pressure on the radially outer region of the 'O' ring which might otherwise tend to force the 'O' ring into the groove 18.

Figure 2:
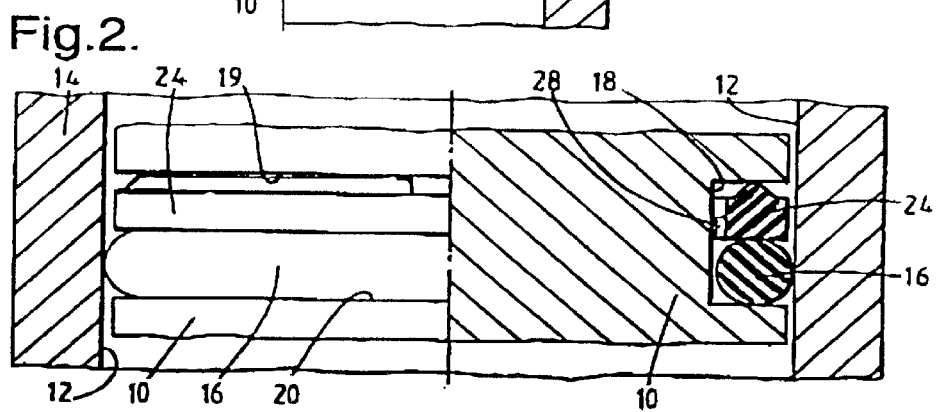
FIG. 2 is a fragmentary diagrammatic sectional view of another seal arrangement embodying the invention.

To satisfy condition (a) the annular biasing element 22, 24 must apply sufficient pressure to keep the seal 16 on the lower pressure wall 20 even when the seal carrier 10 is moving in the direction of the pressure, i.e. downwardly in the examples shown in FIGS. 1 and 2, when the pressure differential is small and when the lubrication is marginal. On the other hand it must not apply so much axial pressure that the seal cannot align itself readily, again under marginal lubrication conditions. All these conditions must be met throughout the range of combinations of tolerances of the constituent parts. This means that for a typical 1.78 mm section 'O' ring the force must be within the above restraints over a tolerance range of the order of 0.25 mm.

The biasing element 22 in the embodiment of FIG. 1 comprises a canted spring ring. However, such spring rings are relatively bulky and expensive to produce and a preferred solution is the use of elastomeric loading ring 24 as shown in FIG. 2. In the left half of FIG. 2, the member 14 is shown in section and the shaft 10, 'O' ring 16 and loading ring 24 are shown in elevation. In the right half of FIG. 2, the member 14, shaft 10, and rings 16 and 24 are all shown in section along the shaft axis, to illustrate the profile of the ring 24. In FIG. 2, the elastomeric leading ring is placed in the widened groove 18, with the 'O' ring 16. This loading ring 24 has four main characteristics. It has a profile on the axial face 24a, remote from the 'O' ring 16, which has a progressive deformation characteristic but which is stable and is not stressed beyond the fatigue limit of the material. It has a smooth face 124b on the side which butts up against the 'O' ring 16. It has a means of centralising itself relative to the axis of the 'O' ring groove 18 so that its outer edge of the loading ring 24 does not rub on the bore 12, with a consequent increase in friction, but at the same time there must be a free passage for gas over the inner edge of the loading ring 24 so that the inside of the floating 'O' ring 16 can be energised without restriction. In the design shown in FIG. 2, this centralisation is achieved by nodules 28 on the radially inner side or the loading ring 24, which nodules contact the bottom 21 of the groove. Finally, the ring 24 must be so formed, on the face 36b remote from the 'O' ring 16 as to allow free passage of gas to the bottom of the groove 18 even when the deformable element 24 is compressed to its maximum limit. This may be achieved by the provision of one or more grooves 36a extending generally radially across the upper (in FIG. 2) surface 36b of the loading ring 24. It will be appreciated that the same effect might be achieved by forming transverse bores through the material of the loading ring or by providing the loading ring with transverse grooves on its side engaging the 'O' ring.

A ring to the design of FIG. 2 has been shown to have the characteristics required, i.e. it will allow "floating" 'O' rings to operate under a wide range of pressure differential situations when assembled with a total tolerance of components (groove width+'O' ring section+loading ring) of 0.25 mm and when lubricated between the extremes of fully packed to effectively dry.

Figures 3A, 3B:
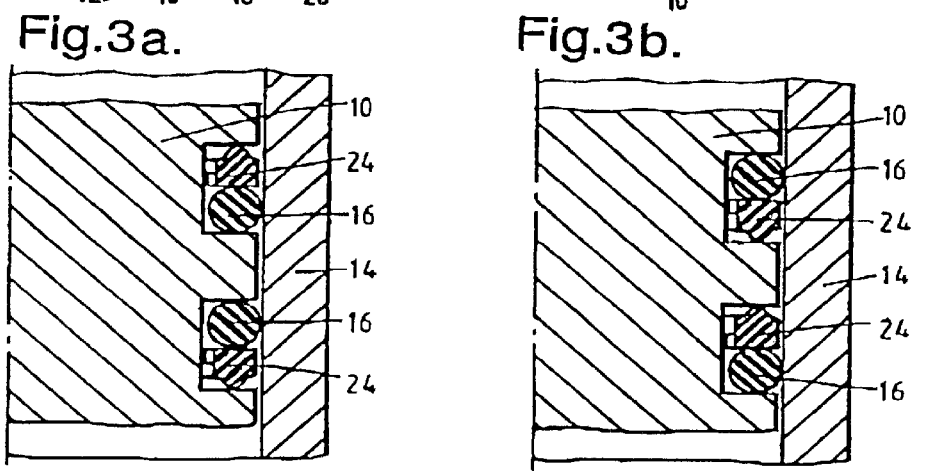
FIGS. 3a and 3b are fragmentary diagrammatic views of further seal arrangements embodying the invention.

The arrangement described is suitable for single acting systems where sealing is only required with the pressure differential acting in one direction. In double acting systems two seal assemblies are used in adjacent grooves as shown in FIGS. 3(a) and 3(b), each sealing assembly comprising an 'O' ring 16 and a loading ring 24, of the type shown in FIG. 2, disposed in a respective groove. Each sealing assembly seals when exposed to a pressure differential in one direction and gives free flow to gas pressurised to the opposite differential. In this way there is no problem with gas trapping between seals which can be a problem in certain other double seal arrangements. Thus, in FIG. 3(a) the upper sealing assembly provides a seal when the pressure above both sealing assemblies exceeds that below the sealing assemblies and the lower sealing assembly provides a seal when the pressure below both sealing assemblies exceeds that above the sealing assemblies. In the arrangement of FIG. 3(b) the lower sealing assembly provides a seal when the pressure above both sealing assemblies is the greater and the upper sealing assembly provides a seal when the pressure below both sealing assemblies is the greater.

Figure 5:
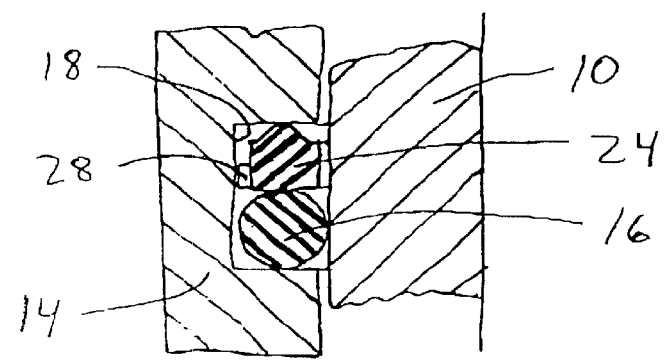
FIG. 5 is a sectional view, similar to FIGS. 2, 3a and 3b, of an arrangement in accordance with the invention in which the sealing ring and loading ring are received in a groove formed around a bore in which a smooth rod is slidable.

It will be appreciated that the sealing arrangements according to the invention may, at choice, be accommodated, as shown, in grooves formed around a rod or piston 10 for engagement with a smooth bore 12, or may be accommodated in circumferential grooves around a bore 12, for engagement with the smooth surface of a rod 10 (see FIG. 5).

In the arrangements described above with reference to the drawings, the loading ring is an item separately formed from the 'O' ring but in some arrangements (not shown) the 'O' ring/loading ring combination may be replaced by a unitary sealing ring having a sealing portion engaging the bore 12 and the groove wall on the low pressure side of the seal and having a clearance with respect to the groove bottom, and an integral loading portion extending from the sealing portion towards the groove wall on the high pressure side of the seal and engaging the last-mentioned groove wall, the loading portion having transverse grooves to allow free passage of gas from the high pressure part of the sealed gap to the region of the groove between the groove bottom and the sealing portion. The sealing portion of the sealing ring may be part circular in half axial section, with a sealing surface with at least one quarter of the profile in the form of the 'O' ring and the other sector in the form of the loading ring.

Figure 4:
FIG. 4 illustrates an alternative form of sealing ring which may be used in embodiments of the invention.

The technique described with reference to FIGS. 1 to 3(b) could also be used with elastomeric sealing rings other than 'O' rings such as the 4-lobed seal shown in diametral axial section in FIG. 4 and such as seals of asymmetric section.

Although described for pneumatic systems because it particularly addresses the problem of marginal lubrication, the techniques described may also be applied to hydraulic systems.

It will also be understood that whilst, in the examples described above, it has been assumed that the rod 10 is slidable along the bore 12, the seal will be equally effective for a rod 10 rotating in the bore 12.

In each of the embodiments of the invention illustrated in the drawings, the resilient biasing or loading element 22 or 24 acts between the "O" ring 16, on the one hand, and the wall 19 of the groove 18 remote from the "O" ring 16, on the other hand, in such a way as to apply an exclusively axial force to the "O" ring (i.e. a force acting parallel with the axis of rod or piston 10 and bore 12), thus serving to urge the sealing ring 16 exclusively in the axial direction against the opposing wall 20 of the groove.

Thus, the force applied to the sealing ring 16 by the loading element 22 or 24 has no lateral component which would either (a) force the sealing ring 16 more firmly against the bore 12 and therefore undesirably increase frictional resistance to movement of the rod or piston 10 or (b) tend to move the sealing ring 16 away from the bore 12 and thus break the seal between the sealing ring 16 and the bore 12. The circular cross-section of the "O" ring 16 ensures that normally the area of contact between the ring 16 and the wall of bore 12 is minimal, whereby frictional resistance to movement of the rod or piston 10 is minimised, and it is important that any loading arrangement for the "O" ring should not detract from this advantage.

In the embodiments of FIGS. 2, 3a and 3b, the purely axial biasing of the "O" rings 16 by the elastomeric loading rings 24 is achieved by ensuring that the surface of each loading ring 24 which engages the respective "O" ring is a flat planar surface lying in a plane perpendicular to the axis of the rod 10 and cylinder 12. The walls 19, 20, of the groove 18 are, of course, also planar, lying in respective planes perpendicular to the axis of rod 10 and cylinder 12.

Figure 8:
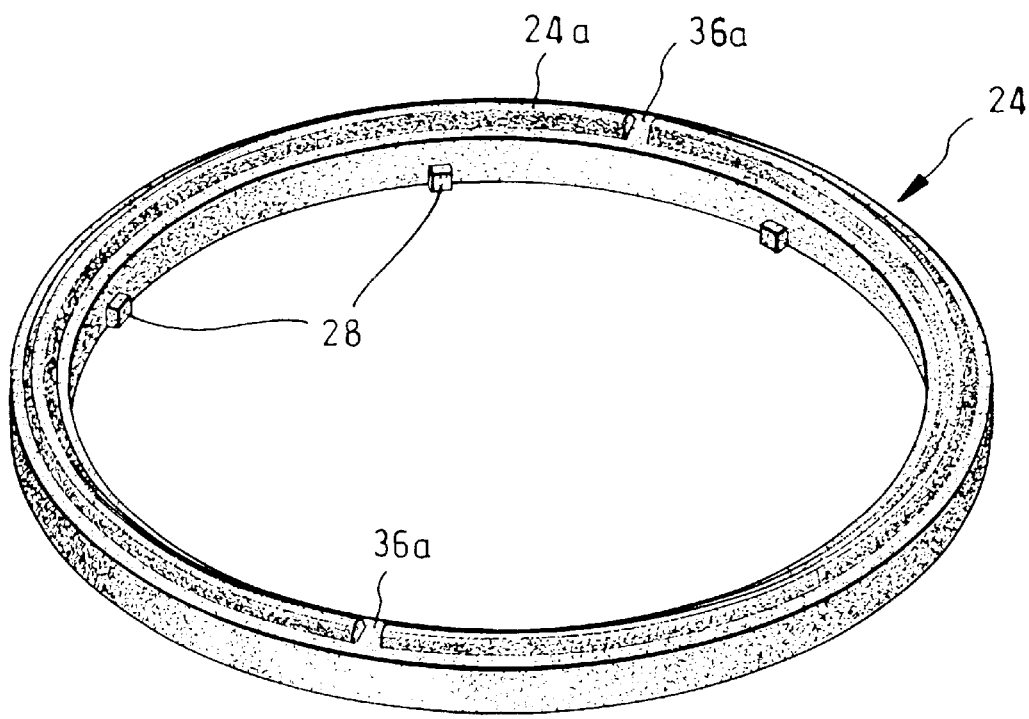
FIG. 8 is an isometric view of an elastomeric loading member of the present invention.

Referring now to FIG. 8, the groove 36a, which can be considered a "groove", a "recess" or a "passage" for the purpose of illustrating the present invention, is shown. In operation, the face 24a of the elastomeric loading ring 24 has, at least at some circumferential positions therearound, a cross-sectional profile which reduces in width towards wall 19 of the groove 18.

Figure 6:
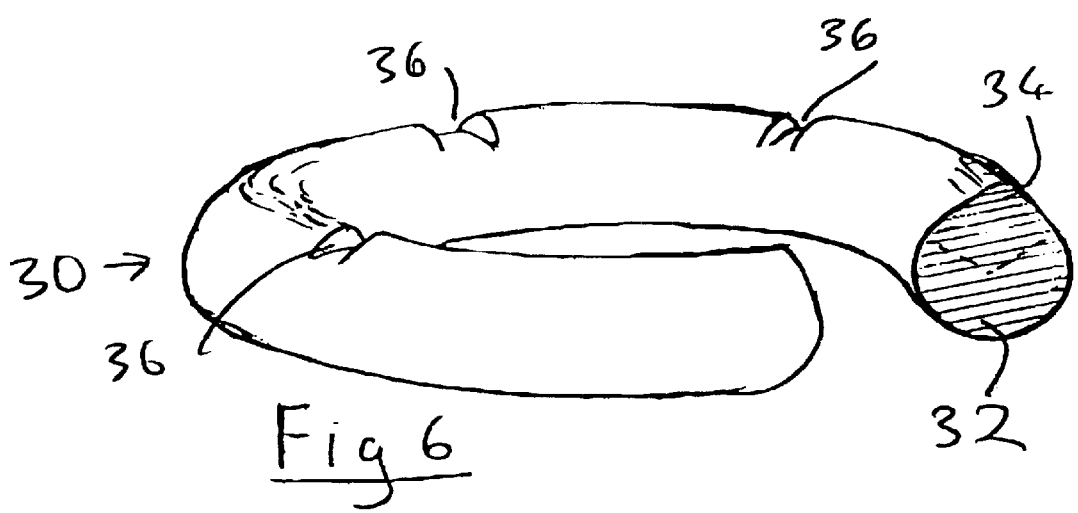
FIG. 6 is a perspective view, partly cut away in section, of a combined, unitary sealing and loading ring
Figure 7:
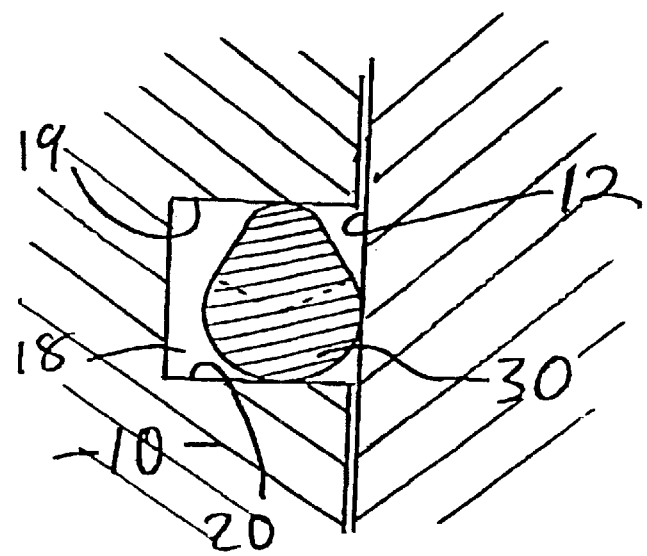
FIG. 7 is an axial section view, similar to FIGS. 2, 3a, and 3b of an arrangement incorporating the unitary sealing and loading ring of FIG. 6.

FIGS. 6 and 7 are respectively a perspective view, partly in section, of a unitary sealing ring 30 such as is referred to above having a sealing portion 32 for engagement with one wall (20) of the groove (18), accommodating the ring. in the rod or bore and for engagement with the un-grooved bore or rod, and having an integral loading portion 34 with transverse grooves 36 providing passages for the flow of fluid between, on the one hand, the gap between the rod 10 and the bore 12 and, on the other hand, the region between the ring and the bottom of the groove 18. In the embodiment of FIGS. 6 and 7, the ring 30 has, in section in a plane containing the axis of the rod 10, bore 12 and ring 30, a shape of which the lower portion (as illustrated) comprises a sector, extending over, for example, 120°, of larger circle and an upper portion comprising tangents from the ends of the lower portion sector to a minor sector of a smaller circle and which upper portion corresponds to the loading portion 34. (The broken lines in FIGS. 6 and 7 represent limiting radii of the larger sector). Thus, such section of the ring 30 is approximately pear-shaped, the larger lower portion forming the sealing portion 32.

The sealing portion 32 of the ring 30, defining the larger sector, contacts tangentially the lower groove wall 20 and the bore 12. The points of contact (as viewed in section in FIG. 7) of the portion 36 with the bottom groove wall 20 and of the portion 34 with the upper groove wall 19 thus lie on a line, containing the centres of curvature of the larger and smaller sectors referred to, which is perpendicular to the groove walls 19 and 20, (which in turn, of course, are perpendicular to the axis of the rod 10 and bore 12).

What is claimed is:

1. A seal arrangement providing a seal between a passage and a rod moveable in said passage, said passage and said rod having a gap therebetween, the seal arrangement including an elastomeric ring which is accommodated in a circumferential groove around said rod and which sealingly engages the wall of said passage and one wall of said groove, but is spaced radially from the bottom of said groove, said ring being compressed axially between the opposing walls of said groove and being configured, on the side of said ring engaging the groove wall opposite said one wall, so as to provide at least one passage for fluid flow between, on one hand, the gap between said rod and said passage, and, on the other hand, the region between the ring and the bottom of said groove.

2. A seal arrangement providing a seal between a passage and a rod moveable in said passage, said passage and said rod having a gap therebetween, the seal arrangement including an elastomeric ring which is accommodated in a circumferential groove around said passage and which sealingly engages the surface of said rod and one wall of said groove, but is spaced radially from the bottom of said groove, said ring being compressed axially between the opposing walls of said groove and being configured, on the side of said ring engaging the groove wall opposite said one wall, so as to provide at least one passage for fluid flow between, on one hand, the gap between said rod and said passage, and, on the other hand, the region between the ring and the bottom of said groove.

* * * * *

UNITED STATES PATENT AND TRADEMARK OFFICE
CERTIFICATE OF CORRECTION

PATENT NO.     : 6,588,763 B1
DATED          : July 8, 2003
INVENTOR(S)    : Norman Stewart Jones et al.

It is certified that error appears in the above-identified patent and that said Letters Patent is hereby corrected as shown below:

Column 4,
Line 38, "leading" should read -- loading --.
Line 43, "124$b$" should read -- 24$b$ --.

Signed and Sealed this

Sixteenth Day of September, 2003

JAMES E. ROGAN
*Director of the United States Patent and Trademark Office*